United States Patent
Bramley, Jr.

(10) Patent No.: US 10,586,047 B2
(45) Date of Patent: Mar. 10, 2020

(54) SECURELY SENDING A COMPLETE INITIALIZATION PACKAGE

(71) Applicant: HEWLETT-PACKARD DEVELOPMENT COMPANY, L.P., Houston, TX (US)

(72) Inventor: Richard A. Bramley, Jr., Mansfield, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 270 days.

(21) Appl. No.: 15/308,986

(22) PCT Filed: Jun. 30, 2014

(86) PCT No.: PCT/US2014/044886
§ 371 (c)(1),
(2) Date: Nov. 4, 2016

(87) PCT Pub. No.: WO2016/003415
PCT Pub. Date: Jan. 7, 2016

(65) Prior Publication Data
US 2017/0103208 A1    Apr. 13, 2017

(51) Int. Cl.
*G06F 9/455* (2018.01)
*G06F 21/57* (2013.01)
*G06F 21/51* (2013.01)

(52) U.S. Cl.
CPC ........ *G06F 21/572* (2013.01); *G06F 9/45558* (2013.01); *G06F 21/51* (2013.01); *G06F 21/575* (2013.01); *G06F 2009/45587* (2013.01)

(58) Field of Classification Search
CPC ................................... G06F 9/45533
USPC ........................................... 718/1
See application file for complete search history.

(56) References Cited

U.S. PATENT DOCUMENTS

| 8,131,534 B2 * | 3/2012 | Kinney | G06F 9/45533 703/26 |
| 8,527,673 B2 * | 9/2013 | Mahalingam | G06F 13/105 710/26 |
| 8,656,482 B1 | 2/2014 | Tosa et al. | |
| 9,225,707 B1 * | 12/2015 | de Sousa | G06F 21/629 |

(Continued)

FOREIGN PATENT DOCUMENTS

WO    WO-2007-042439    4/2007

OTHER PUBLICATIONS

"Initramfs: an Overview"; Dec. 17, 2009; 5 pages.
(Continued)

*Primary Examiner* — Mehran Kamran
(74) *Attorney, Agent, or Firm* — HPI Patent Department

(57) ABSTRACT

Securely sending a complete initialization package in one example implementation can include adding a resource identifier that includes a mapping of a driver to a hardware component included in a physical machine hosting VMs to an initial random-access memory (RAM) file system (INIT-RAMFS) stored in memory of the physical machine to form a complete initialization package, sending the complete initialization package from read-only memory (ROM) of the physical machine to a location in RAM of the physical machine accessible by a hypervisor, and authenticating that the complete initialization package is secure.

15 Claims, 3 Drawing Sheets

(56) References Cited

U.S. PATENT DOCUMENTS

| | | | | |
|---|---|---|---|---|
| 2003/0033051 A1* | 2/2003 | Wilkes | G06F 3/0601 | 700/200 |
| 2003/0115443 A1* | 6/2003 | Cepulis | G06F 9/4406 | 713/2 |
| 2004/0117338 A1* | 6/2004 | Kennedy | G06F 8/63 | |
| 2005/0228968 A1* | 10/2005 | Yang | G06F 9/30043 | 712/1 |
| 2006/0026429 A1* | 2/2006 | Kudo | G06F 21/575 | 713/173 |
| 2006/0291504 A1* | 12/2006 | Cohn | G06F 17/30887 | 370/473 |
| 2007/0061818 A1* | 3/2007 | Williams | G06F 9/4411 | 719/327 |
| 2007/0180509 A1 | 8/2007 | Swartz et al. | | |
| 2008/0127171 A1* | 5/2008 | Tarassov | G06F 8/60 | 717/174 |
| 2008/0165971 A1* | 7/2008 | de Cesare | G06F 21/575 | 380/277 |
| 2008/0196043 A1* | 8/2008 | Feinleib | G06F 11/0712 | 719/319 |
| 2008/0222309 A1* | 9/2008 | Shanbhogue | G06F 21/53 | 709/250 |
| 2009/0119087 A1 | 5/2009 | Ang et al. | | |
| 2009/0172660 A1* | 7/2009 | Klotz, Jr. | G06F 9/5077 | 718/1 |
| 2009/0174718 A1* | 7/2009 | Li | G06F 9/4411 | 345/501 |
| 2009/0178033 A1* | 7/2009 | Challener | G06F 9/4411 | 717/168 |
| 2010/0115257 A1* | 5/2010 | Hoang | G06F 11/1417 | 713/2 |
| 2010/0153617 A1* | 6/2010 | Miroshnichenko | G06F 3/061 | 711/6 |
| 2010/0238185 A1* | 9/2010 | Tseng | G06F 13/4072 | 345/536 |
| 2011/0035754 A1* | 2/2011 | Srinivasan | G06F 9/4856 | 718/105 |
| 2011/0035808 A1 | 2/2011 | Butler et al. | | |
| 2011/0145814 A1* | 6/2011 | Mangione-Smith | G06F 9/5077 | 718/1 |
| 2011/0246714 A1* | 10/2011 | Zhou | G06F 8/63 | 711/112 |
| 2011/0280125 A1* | 11/2011 | Jayakumar | H04L 47/805 | 370/230 |
| 2012/0054740 A1* | 3/2012 | Chakraborty | G06F 9/45558 | 718/1 |
| 2012/0102305 A1* | 4/2012 | Liang | G06F 9/4406 | 713/2 |
| 2012/0154375 A1* | 6/2012 | Zhang | G06F 9/4411 | 345/419 |
| 2012/0311341 A1 | 12/2012 | Paris et al. | | |
| 2012/0331540 A1* | 12/2012 | Hoffman | H04L 9/3268 | 726/10 |
| 2013/0067501 A1* | 3/2013 | Oshins | G06F 13/105 | 719/327 |
| 2013/0151835 A1* | 6/2013 | Fontignie | G06F 9/4416 | 713/2 |
| 2013/0290694 A1 | 10/2013 | Civilini et al. | | |
| 2013/0297964 A1* | 11/2013 | Hegdal | G06F 11/0712 | 714/2 |
| 2013/0339957 A1* | 12/2013 | Azam | G06F 9/54 | 718/1 |
| 2014/0013010 A1 | 1/2014 | Mahalingam et al. | | |
| 2014/0055466 A1* | 2/2014 | Petrov | G06F 9/45533 | 345/520 |
| 2014/0317394 A1* | 10/2014 | Buhler | G06F 9/4416 | 713/2 |
| 2014/0344488 A1* | 11/2014 | Flynn | G06F 5/14 | 710/52 |
| 2015/0033002 A1* | 1/2015 | Cordero | G06F 12/023 | 713/1 |
| 2015/0040123 A1* | 2/2015 | Gerdts | G06F 17/30233 | 718/1 |
| 2015/0052281 A1* | 2/2015 | Hart | G06F 13/16 | 710/308 |
| 2015/0121059 A1* | 4/2015 | Davis | G06F 9/44505 | 713/100 |
| 2015/0178108 A1* | 6/2015 | Tarasuk-Levin | G06F 9/45558 | 718/1 |
| 2015/0235030 A1* | 8/2015 | Chaiken | G06F 21/572 | 726/22 |
| 2015/0331693 A1* | 11/2015 | Shanley | G06F 8/63 | 713/2 |
| 2015/0356034 A1* | 12/2015 | Pamley | G06F 13/1684 | 710/308 |
| 2016/0239285 A1* | 8/2016 | Jana | G06F 8/61 | |
| 2016/0314008 A1* | 10/2016 | Han | G06F 9/45537 | |
| 2017/0116010 A1* | 4/2017 | Lissack | G06F 9/45533 | |
| 2017/0154185 A1* | 6/2017 | Chaiken | G06F 21/572 | |

OTHER PUBLICATIONS

"Moving Data From Bootloader Memory to Linux Userspace"; Jul. 11, 2012: 7 pages.

Intel; "Intel® Virtualization Technology for Directed I/O", Architecture Specification: Revision: 1.1; Sep. 2007; 148 pages.

Szefer, J. et al.; "Eliminating the Hypervisor Attack Surface for a More Secure Cloud", Oct. 17-21, 2011: 12 pages.

* cited by examiner

SECURELY SENDING A COMPLETE INITIALIZATION PACKAGE

BACKGROUND

Virtual machines (VM)s are software implementations of a machine e.g., a computer) that execute programs like a physical machine. VMs can for example, be used to host applications and/or services. VMs, hosted applications and/or hosted services can be represented on a host computer and/or can provide various functionalities via the host computer. VMs can be used in many computing environments and/or by many different devices.

DETAILED DESCRIPTION

Figure 1:
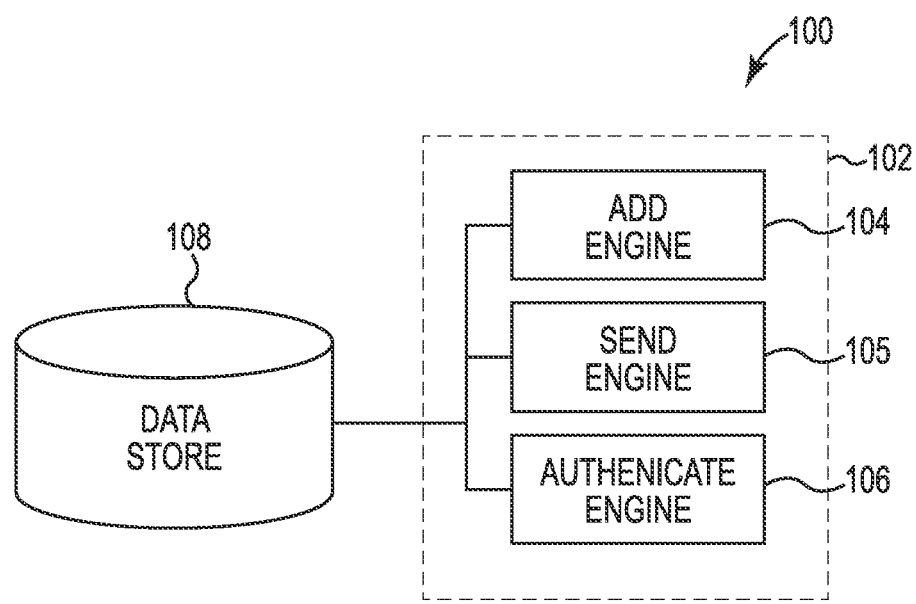
FIG. 1 illustrates a diagram of an example of a system for securely sending a complete initialization package according to the present disclosure.

With increasing pressure on organizations to improve their performance, the organizations may seek to increase efficiencies of services provided, for instance, by pursuing improved performance and/or expanded functionalities of virtual machines (VM)s. A VM refers to software and/or hardware-based emulation of a physical machine (e.g., a computer). A VM can be hosted by a host system. The host system can include a physical server and/or a physical machine that has a hypervisor and/or other software running on it A hypervisor refers to software that provides a virtualized environment to VMs in that various other software, including operating systems, can run with an appearance of full access to underlying hardware, but in fact such access is under control of the hypervisor.

Some approaches for providing VMs may employ an operating system (OS) under control of a hypervisor to present visual representations and/or functional representations of hardware components and/or functions provided by the hardware components, respectively, under the control of the hypervisor as generic virtualized devices that provide shared access to hardware components. Such representations tend to be generic in nature (e.g., not specific to particular types of hardware components and/or particular functions of respective hardware components) and/or may be based on widely available and often outdated specifications.

For a variety of reasons, such as those discussed herein, the generic virtualized devices may not provide a desired degree of functionality, or for that matter, may entirely fail to provide at least some of the functionalities offered by the hardware components themselves (e.g., functionalities provided by the hardware devices when operating without the hypervisor). For example, a generic virtualized device representing a video card in a high-end machines (i.e., a high-end computer) and another representing a video card in a low-end machine having comparatively less functionalities (e.g., be without a split screen functionality and/or a graphics acceleration function) and/or a degree of a functionality (e.g., lower resolution) may be generically represented as being identical. That is, the generic virtual representations may show both video cards as being identical from the perspective of the VM regardless of the differences in the actual video cards (e.g., differences in the functionalities provided). As a result, the generic representation may again not provide a desired degree of functionality, or for that matter, may entirely fail to provide at least some of the functionalities offered by the hardware components themselves.

In an effort to avoid such a loss of functionalities, some approaches may attempt to pass through control and/or functions (e.g., device 110, memory, and/or interrupt operations, etc.) of a hardware component to a guest OS managed by a hypervisor. Even so, such approaches may still lose some or all functionalities (e.g., functionalities lost due to having no driver and/or a generic non-hardware specific driver provided to a hardware component) of hardware components. Such loss of functionality is particularly evident when a hardware component, such as a video card and/or a hardware component associated with a preboot execution environment (PXE), utilizes initialization instructions (e.g., drivers) specific to the hardware component to provide its functionalities (e.g., function as intended). Such initialization data often has to be updated to function as intended, for example, updating in response to a vendor modifying the hardware component and/or modifying initialization data (e.g., drivers) associated with the hardware component) in an effort to improve its performance and/or functionality, etc. This updating, whether by encoding updated initialization data and/or downloading updated initialization data (downloading from the internet), can be costly ineffective, and/or difficult (e.g., having an access point to the internet to function), among other difficulties.

In addition to the above difficulties, some approaches that may attempt to pass through control and/or functions, including those described above, may inherently present various opportunities for instructions and/or data communicated thereby to be intercepted. For instance, a nefarious entity or other entity that is not intended to have access to the instructions and/or data may encoded a program or other means to obtain the instructions and/or data on a disk memory storing the instructions and/or data to be communicated, among other possible ways in which the nefarious entity may attempt to gain access to the instructions and/or data. In this manner, the instructions and/or data may be intercepted, corrupted, or otherwise undesirably impacted by the nefarious entity during communication of the instructions and/or data (e.g., during communication of the instructions and/or data to an operating system and/or hypervisor).

In contrast, examples of the present disclosure include methods, systems, and computer-readable and executable instructions for securely sending a complete initialization package. Securely sending a complete initialization package can, for example, include adding a resource identifier that includes a mapping of a driver to a hardware component included in a physical machine hosting virtual machines (VM)s to an initial random-access memory (RAM) file system (INITRAMFS) stored in memory of the physical machine to form a complete initialization package, sending the complete initialization package from read-only memory (ROM) of the physical machine to a location in RAM of the physical machine accessible by a hypervisor, and authenticating that the complete initialization package is secure, as described herein. Advantageously, securely sending a complete initialization package can facilitate a VM to be generated that is capable of providing a full functionality of a hardware component, provide comparatively enhanced security, and/or facilitate timely generation of VMs compared to various other approaches, among other advantages.

A complete initialization package, as described herein, refers to initialization instructions (e.g., drivers, INITRAMFS, and/or other executable instructions and/or non-executable instructions) to initialize a hardware component initialize each of a plurality of hardware components). For example, a complete initialization package can include a resource identifier, a driver, and an INITRAMFS, among other information.

A full functionality of a hardware component refers to a full utilization of a functionality of a hardware component. For example, a hardware component, such a video component, can provide a particular resolution. While some approaches (e.g., approaches using hypervisors to generically represent VMs) may provide a partial functionality (e.g., comparatively less functionality than a functionality provided by the hardware component when operating without a hypervisor), full VM functionality includes generation of a VM capable of providing a respective full functionality of the hardware component. Advantageously, providing the respective full functionality of the hardware component can enable realization of a full functionality (e.g., a bare metal functionality of a hardware component) and/or functionality (e.g., an advanced functionality) that other approaches, such as those relying on generic representations of VM's, may not provide or may only partially provide (e.g., comparatively less resolution), among other advantages.

FIG. 1 illustrates a diagram of an example of a system 100 for securely sending a complete initialization package according to the present disclosure. The system 100 can include a data store 108 (e.g., analogous to data store 308 as referenced in FIG. 3), a complete initialization package system 102, and/or a number of engines. The complete initialization package 102 can be in communication with the data store 108. The complete initialization package system 102 can include a number of engines (e.g., an add engine 104, a send engine 105, and an authenticate engine 106 etc.). The complete initialization package system 102 can include additional or fewer engines than illustrated to perform the various functions described herein.

The number of engines can include a combination of hardware and programming to perform a number of functions described herein (e.g., an add engine to add a resource identifier that includes a mapping of a driver to a hardware component included in a physical machine hosting VMs to an INITRAMFS stored in memory of the physical machine to form a complete initialization package, etc.). Each of the engines can include hardware or a combination of hardware and programming designated or designed to execute a module (e.g., a particular module). The programming can include instructions (e.g., software, firmware, etc.) stored in a memory resource (e.g., computer-readable medium) as well as a hard-wired program (e.g., logic). For example, such logic can be included in an INITRAMFS, among other possibilities.

The add engine 104 is to an add a resource identifier that includes a mapping of a driver to a hardware component included in a physical machine hosting VMs and/or the driver mapped to the hardware component to an INITRAMFS stored in memory of the physical machine to form a complete initialization package. The physical machines are described in detail, for instance, in regard to FIG. 3, herein. Hardware components are a collection of physical elements that constitute a physical machine. Examples of hardware components include video cards, a monitor, a mouse, a keyboard, data storage (e.g., memory such as disk memory, RAM, and/or ROM, among other types of data storage), sound cards, among other hardware components.

As used herein, a resource identifier can be an electronic representation that identifies a hardware component and a driver associated with the hardware component (e.g., associated with an address of the hardware component), among other possible information such as a type of a driver, an address associated with a hardware component, etc. An example of a resource identifier includes a pairing of globally unique identifier (GUID) and address of hardware component. However, other resource identifiers suitable to promote securely sending a complete initialization package may be utilized.

The resource identifier can be encoded in data storage (e.g., flash memory) of a physical machine. For example, a resource identifier can be encoded (e.g., at a time of manufacture of a physical machine) into a ROM of a physical machine. In some examples, a bootloader of a physical machine, can send (e.g., copy) the resource identifier from ROM to another location in memory (e.g., a location accessible by a hypervisor). In some examples, a hypervisor can include the resource identifier, send the resource identifier from disk memory to another location in memory, and/or can perform some or all of the number of functions described herein, such as those described with respect to the engines and/or modules.

A resource identifier can be included in a plurality of resource identifiers stored as a table in ROM of a physical machine. For instance, in some example, a plurality of resource identifiers can include resource identifiers having mappings (e.g., mapping drivers to hardware components) to a plurality of different types of pass through machines capable of hosting VMs. For example, a low-end pass though machine (having a comparatively lower resolution video card) and a high-end pass though machine (having a comparatively higher resolution video card) whereby generated VMs include a VM capable of providing the respective full VM functionality (comparatively lower resolution) corresponding of the lower end pass through machine and a VM capable of providing respective full VM functionality (comparatively higher resolution) of the high end pass through machine.

Such storage of a plurality of resource identifiers (e.g., included in a table) can advantageously enable a particular resource identifier to be sent to a location in memory accessible by a hypervisor depending identifying information associated with hardware components included in the physical machine. In this manner, a particular resource identifier of the plurality of resource identifier included in a table can be sent rather than encountering ineffectiveness, inefficiencies, or other difficulties associated with having to downloading a resource identifier to the physical machine.

In some examples, the resource identifier can include resource identifier that identifies an address of the hardware component and/or a driver associated with the hardware component (e.g., associated with an address of the hardware component). An address refers to information that identifies a physical location of the hardware component and/or a location in memory associated with the hardware component, for instance, a location in memory at which the physical machine can access initialization instructions (e.g., a driver) if present and/or assigned. Examples of an address can include a system bus and/or a PCI bus associated with a physical machine and/or a hardware component, among other types of addresses.

Various hardware components can have an associated driver(s) that can facilitate some or all of functionality or functionalities provided by the hardware component. For example, a video card can have a driver (e.g., a video card) stored in a location, of memory accessible by the video, card and/or a hypervisor utilizing the video card, that facilitates the video card to convey data that can be graphically depicted to an OS and/or a graphical user interface (GUI). A driver can correspond to a particular type (e.g., video), make, model, version, etc. of the hardware components. An identify engine (not shown) can identify such identifying information (e.g., a make, model, and/or location, etc.) associated with a hardware component.

That is, various hardware components may have a particular driver provided to the hardware component (e.g., a location in memory associated with the hardware component and/or a hypervisor) to facilitate the hardware component to provide its desired functionality (e.g., provide a desired rate of screen refresh, a desired amount of resolution, etc.). For example, a driver can be an option read-only memory (OpRom) driver and/or a unified extensible firmware interface (UEFI) driver. In such an example, the OpRom or the UEFI driver can facilitate a respective full functionality of a hardware component. A plurality of hardware components can employ a plurality of drivers, for example, each of the plurality of hardware components can have a particular driver provided to it. A driver, such as those described herein, can included in and/or can be in communication with a data store (e.g., data store 308), such as a data store designated as being in a BIOS of a physical machine, that can store drivers, resource identifiers, etc.

In some examples, a driver can be a video graphics array (VGA) OpRom. Such a VGA OpRom is assigned to a hardware component such as a video card and/or facilitates the hardware component to provide its desired functionality (e.g., outputting information capable of being displayed). A UEFI driver can be assigned to a hardware component in response to booting a physical machine (including the hardware component) using a UEFI boot. Similarly, an OpRom driver, as described herein, can be assigned to a hardware component in response to booting a physical machine using, a legacy boot (i.e., a non-UEFI boot).

A send engine 105 is to send, a complete initialization package including a plurality of drivers (e.g., UEFI drivers and/or OpRom drivers), among other information such as an INITRAMFS, stored in memory of the physical machine hosting the VMs and/or a resource identifier, to a location in RAM of the physical machine accessible by the hypervisor. For example, the send engine 105 can, in some examples, send, a complete initialization package to a location in RAM of the physical machine in response to receipt of identified information (e.g., a list of identified hardware components) from the identify engine, among other possibilities. The send engine 105 can send the complete initialization package via various circuitry and/or networks included in the physical machine such as the INITRAMFS, described herein.

A complete initialization package refers to initialization instructions (e.g., drivers and/or other instructions) to initialize each of a plurality of hardware components, such as those (e.g., including those having an advanced functionality such a video card that can use a video driver to provide a functionality to output data capable of being displayed) identified by the identify engine, included in a physical machine. For instance, a complete initialization package can include a resource identifier, a driver (e.g., a driver mapped by the resource identifier to a hardware component), identifying information, and/or an INITRAMFS (e.g., corresponding to the hardware component in the mapping), among other information.

The send engine 105 can send the INITRAMFS as a plurality of images included in a single transmission from ROM of the physical machine to a location in RAM of the physical machine accessible by a hypervisor. The single transmission refers to a single continuous stream of bits. The single transmission and the plurality of images can be in a format that can be utilized by a multi-purpose archive utility such as copy in and out (CPIO) archive. That is, in some examples, the single transmission is a stream of bits corresponding to each of those in a CPIO archive. The headers can correspond to headers in a binary format (e.g. headers including 2-byte and/or 4-byte binary values), among other suitable formats. Such a transmission can promote secure sending of the plurality of images and/or securely sending a complete initialization package. Advantageously, sending as a single transmission from ROM, not to disk memory, can provide enhanced security compared to other approaches such as those that utilize multiple transmission and/or save various information to disk memory, among other advantages.

For instance, an image of the plurality of images includes a respective header portion and a respective information portion associated with a resource identifier, such as the resource identifier added by the add engine 104. In this manner, respective headers and information portions such as those corresponding to a resource identifier and/or information included in a resource identifier (e.g., a GUID and an address of a hardware component) and/or driver can be added to as an image to a plurality of images in a CPIO archive, among other multi-purpose archive utilities.

In some examples, an assign engine (not shown) is to assign driver of the plurality of drivers, such as those sent by the send engine 105, to the hardware component based on a resource identifier that includes a mapping of the driver to the hardware component. A driver can facilitate respective full functionalities of hardware components. For example, the plurality of drivers can include drivers to facilitate each of the hardware components included a physical machine and/or each of the hardware components included in a plurality of physical machines. The assign engine can assign at least one of the OpRom driver or the UEFI driver to the hardware component associated with the pass through machine using a resource identifier that maps the hardware component to the driver. Assigning can include mapping a driver to a hardware component, maintaining a mapping of a driver to a hardware component, and/or otherwise causing a driver to be associated with a hardware component to facilitate a respective full functionality of the hardware component via the driver mapped thereto. Assignment can occur in response to receipt of a complete initialization package from the send engine 105, among other possibilities.

In some examples, a hardware component can have a plurality of resource identifiers assigned to the hardware component. For example, at least two of a plurality of resource identifiers such as those included a table can be sent and/or assigned to a hardware component, among other suitable ways to assign a plurality of resource identifiers to a hardware component.

An authenticate engine 106 can authenticate that the complete initialization package is secure. For instance, a component (e.g., an INITRAMFS) included in the complete initialization package and/or a plurality of components included in the complete initialization package can have a cryptographic signature(s) among other information suitable for authenticating the components(s) and/or a complete initialization package including the same is secure. For instance, an INITRAMFS can have a cryptographic signature(s) associated with it that can enable authentication that INITRAMFS sent to a location in memory (e.g., a location in memory accessible by a hypervisor) is the same and/or unmodified from the INITRAMFS stored in disk memory of a physical machine (e.g., an INITRAMFS stored in disk memory of a physical machine at a time of manufacture of the physical machine, etc.).

For example, a cryptographic signature associated with an INITRAMFS can be used to compute a hash or other value that may be used to authenticate a component included in a complete initialization package. Such computation can, for example, can occur during and/or subsequent to sending an INITRAMFS to a location in RAM, as described herein. Similarly, authentication can occur during and/or in response to sending an complete initialization package to the location in the RAM of the physical machine accessible by the hypervisor Examples of suitable hashing functions to compute a hash value from a cryptographic signature or other information include SHA-224, SHA-256, SHA-384, SHA-512, SHA-512/224, SHA-512/256, among other suitable hashing functions. Such hashing functions can be used by the authenticate engine 106 to determine if a complete initialization package is secure (e.g., a computed hash matches an anticipated value) or if the complete initialization package is corrupt (e.g., a computed hash does not matches an anticipated value), among other possible ways to authenticate the complete initialization package as being secure.

A generate engine (not shown) can generate a VM capable of providing the respective full functionality of the hardware component, such as a hardware component identified by the identify engine and/or a hardware component sent a complete initialization package by the send engine 105. Put another way, the respective full functionality, capable of being provided by the generated VM, is equal to a functionality provided by the hardware component when operating without a hypervisor (e.g., bare metal operation of the hardware component). In some examples, the VM can be generated in response to a request for a VM (e.g., a VM having the respective full functionality). A merchant and/or an owner/operator of a hypervisor can generate the UM and/or a resource identifier.

The generated VMs can use particular drivers that facilitate full functionality of the hardware in the VMs. Thus, in some examples, a particular VM, providing a respective full functionality of a hardware component, can be generated for each of the hardware components in a physical machine(s). For instance, particular drivers can be sent and/or assigned, as described herein, based on identifying information such as a type, a make, a module, a date of manufacturer, among other information associated with the hardware component. In some examples, the method can include displaying, via a graphical user interface of a support device, the generated VMs (e.g., graphical representations) having the respective full functionalities of the respective hardware components. Similarly, the method can include displaying a representation of the added imaged that includes a file name associated with the mapping.

Figure 2:
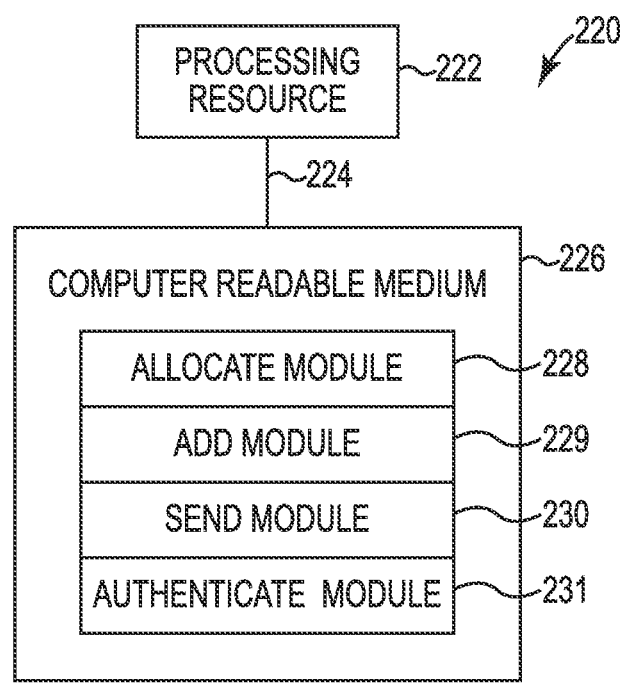
FIG. 2 illustrates a diagram of an example computing device according to the present disclosure.

FIG. 2 illustrates a diagram of an example of a computing device for securely sending a complete initialization package according to the present disclosure. The computing device 220 can utilize software, hardware, firmware, and/or logic to perform a number of functions described herein.

For example, the computing device 220 can be a combination of hardware and instructions for securely sending a complete initialization package. The hardware, for example can include a processing resource 222 and/or a memory resource 226 (e.g., computer-readable medium (CRM), data store, etc.) A processing resource 222, as used herein, can include a number of processors capable of executing instructions stored by a memory resource 226. Processing resource 222 can be integrated in a single device or distributed across multiple devices (e.g., multiple servers). The instructions (e.g., computer-readable instructions (CRI)) can include instructions stored on the memory resource 226 and executable by the processing resource 222 to implement a desired function (e.g., generate VMs having the respective full functionalities of the respective hardware components, etc.).

The memory resource 226 can be in communication with a processing resource 222. A memory resource 226, as used herein, can include a number of memory components capable of storing instructions that can be executed by processing resource 222. Such memory resource 226 can be a non-transitory CRM. Memory resource 226 can be integrated in a single device or distributed across multiple devices. Further, memory resource 226 can be fully or partially integrated in the same device as processing resource 222 or it can be separate but accessible to that device and processing resource 222. Thus, it is noted that the computing device 220 can be implemented on a physical machine and/or a collection of physical machines, on a support device, on a collection of support devices, and/or on a combination of the physical machines and/or support devices.

The memory resource 226 can be in communication with the processing resource 222 via a communication link (e.g., path) 224. The communication link 224 can be local or remote to a computing device associated with the processing resource 222. Examples of a local communication link 224 can include an electronic bus internal to a computing device where the memory resource 226 is one of volatile, non-volatile, fixed, and/or removable storage medium in communication with the processing resource 222 via the electronic bus.

The memory resource 226 can include a number of modules such as an allocate module 228, an add module 229, a send module 230, an authenticate module 231, etc. The number of modules 228, 229, 230, 231 can include CRI that when executed by the processing resource 222 can perform a number of functions. The number of modules 228, 229, 230, 231 can be sub-modules of other modules. For example, the allocate module 228 and the add module 229 can be sub-modules and/or contained within the same computing device. In another example, the number of modules 228, 229, 230, 231 can comprise individual modules at separate and distinct locations (e.g., CRM, etc.).

Each of the number of modules 228, 229, 230, 231 can include instructions that when executed by the processing resource 222 can function as a corresponding engine, including those as described herein. For example, the allocate module 228 can include instructions that when executed by the processing resource 222 can function as an allocate engine (not shown), for instance, to allocate an amount of memory sufficient to receive a complete initialization package. Similarly, the send module 230 can include instructions that when executed by the processing resource 222 can function as the send engine 105.

The allocate engine 228 can include instructions that when executed by the processing resource 222 can allocate an amount of memory sufficient to receive a complete initialization package in response to the complete initialization package being formed, as described herein, among other possibilities. An amount of memory sufficient to receive a complete initialization package refers to a particular type (e.g., RAM) and an particular amount of memory (e.g., 500 kilobytes or other amount that is greater than a size of the complete initialization package) that is accessible by a hypervisor. A size of a complete initialization package can include a sum of an amount of memory associated with each image (e.g., a header and corresponding content such as drivers, resource identifiers, addresses of hardware components, etc.) of a plurality of images used to send a complete initialization package to a location in memory accessible by a hypervisor, among other data included in or associated with the complete initialization package. Allocating an amount of memory sufficient to receive a complete initialization package can advantageously promote generation of VMs having a full functionality, as described herein, in contrast to other approaches that may provide a nominal amount of memory for information associated with generic representations of VM that are unable to provide a full functionality of the underlying hardware components.

An add module 229 can include instructions executable by the processing resource 222 to add a resource identifier that includes a mapping of a driver to a hardware component included in a physical machine hosting VMs to an INITRAMFS stored in RAM of the physical machine to form the complete initialization package that includes the resource identifier, the driver, and the INITRAMFS. Notably, the resource identifier is added using a memcpy( ) function or other function suitable to add the resource identifier to RAM, not writing the resource identifier to disk memory. This can promote reliable, timely, and secure booting of a physical machine, among other advantages.

A send module 230 can include instructions executable by the processing resource 222 to send a complete initialization package (e.g., a complete initialization package including a resource identifier from ROM memory of a physical machine) to a location in RAM of the physical machine accessible by a hypervisor, as described herein. For example, send module 230 can send a complete initialization package including a plurality of drivers that include at least one of an OpRom driver or a UEFI driver that facilitates a respective full functionality of the hardware component to a location in RAM of the physical machine accessible by the hypervisor. Such a driver can enable communication between the hardware component and an operating system (e.g., an operating system of a pass through machine, as described herein, to facilitate a respective full functionality of the pass through machine, among other advantages. An authenticate module 231 can include instructions executable by the processing resource 222 to authenticate the complete initialization package is secure, as described herein.

Figure 3:
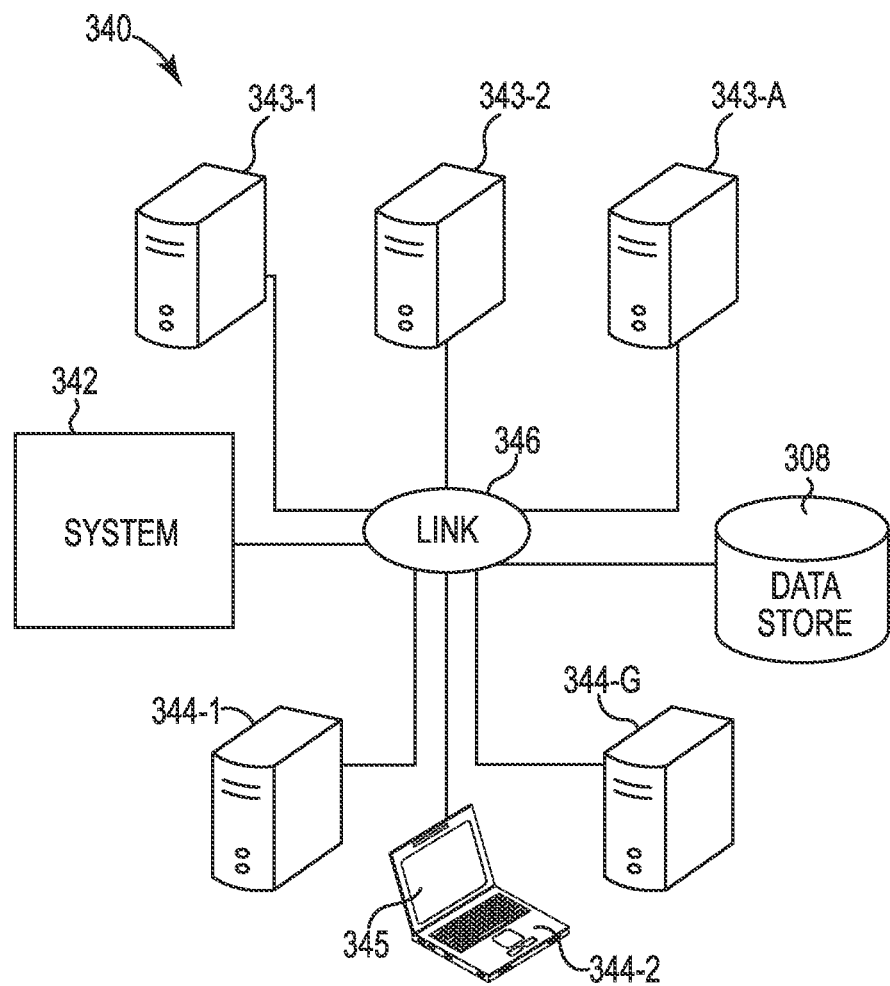
FIG. 3 illustrates an example of an environment in which various example processes can be implemented for securely sending a complete initialization package according to the present disclosure.

FIG. 3 illustrates an example of an environment 340 in which various example processes can be implemented for securely sending a complete initialization package according to the present disclosure. The environment 340 is shown to include a system 342 for securely sending a complete initialization package, support devices 343-1, 343-2, . . . , 343-A, physical machines 344-1, 344-2, . . . , 344-G, a data store 308, and a link 346.

The system 342 for securely sending a complete initialization package can represent different combinations of hardware or hardware and instructions to promote securely sending a complete initialization package. The system 342 for securely sending a complete initialization package can include a computing device (not shown), for instance, computing device 220 as discussed with respect to FIG. 2. The system 342 can include engines analogous to engines described with respect to FIG. 1. For example, the system 342 can include an add engine, a send engine, and an authentication engine, as described herein with respect to FIG. 1, among other engines.

Representation of VMs having respective full functionalities and/or representations of the complete initialization package (e.g., files names associated with images in the complete initialization package received by an OS), among other information, can be viewed using a support device, such as support devices 343-1, . . . , 343-A. Support devices 343-1, . . . , 343-A represent devices that can generate/receive electronic data having browsers and/or other applications to communicate such data and/or facilitate viewing of identifying information, a complete initialization package, and/or representations of VMs, among other abilities. Examples of support devices 343-1, . . . , 343-A include desktop/laptop computers, mobile phones, and/or servers, among other devices suitable to promote securely sending a complete initialization package.

Similarly, examples of physical machines 344-1, . . . , 344-G can include desktop/laptop computers, mobile phones, and/or servers, among other devices suitable for securely sending a complete initialization package. Physical machines 344-1, . . . , 344-G can include a hypervisor and represent devices that can generate/receive electronic data having browsers and/or other applications to communicate such data and/or facilitate viewing of identifying information, complete initialization packages, and/or representations of VMs, among other abilities. For example, physical machines 344-1, . . . , 344-G can include pass through machines that can pass through a respective full functionality of a VM to a guest OS, such as a guest OS viewed via a display of a support device 343-1, . . . , 343-A. That is, in some examples, a display of a support device can display generated VMs having the respective full functionalities of the respective hardware components.

A physical machine can include sections such as a basic input/output systems (BIOS) section, a bootloader section, and/or a hypervisor section, among other sections. The BIOS section can refer to software (e.g., firmware) including information that runs when a physical system is booted (e.g., a legacy boot or a UEFI boot). The information in the BIOS can include drivers, among other information. For instance, the BIOS can include a plurality of drivers and/or INITRAMFS that, in addition to the added resource identifiers, enable a complete initialization package (e.g., a complete initialization package capable of initializing a plurality of physical machines and/or a plurality of hardware components), as described herein, to be constructed. In some examples, the BIOS can include a flash based file system storing drivers, among other information.

A bootloader section refers to a bootloader and/or a location in memory associated with a bootloader. The bootloader may itself is a trusted entity having access to a location(s) in memory that the BIOS section can access and/or locations in memory the hypervisor section can access), among other access rights and/or permissions (e.g., generate information, read/write, etc.). For example, a bootloader section can copy (e.g., though use of a "move" command, a mem(copy) function, or other manner) initialization instructions from a location in BIOS memory associated with the BIOS section to a location in memory associated with the bootloader section, such as a buffer memory, and/or the hypervisor section. In some examples, a bootloader can generate various types of information such as a cryptographic signature associated with an INITRAMFS, among other information.

A hypervisor section corresponds to a hypervisor and/or a location in memory associated with a hypervisor (e.g., a location in memory that a hypervisor reads instructions from). For example, initialization instructions from a location in BIOS memory may be moved by a bootloader to buffer memory accessible by bootloader and moved from the buffer memory to a memory location the hypervisor has access to (e.g., moved from buffer memory in response to handing control from the bootloader to an OS). Similarly a resource identifier can be added and/or moved, for instance, through use of a mem(copy) function by the bootloader to buffer memory and/or to a memory location the hypervisor has access to.

For example, a legacy boot can be associated with a complete initialization package can include a VGA OpRom(s) such as VGA OpRom, while a UEFI boot can be associated with a complete initialization packaged including a UEFI driver(s). In either case, the initialization instructions are sent from the BIOS section to a bootloader section and to a hypervisor section. In this manner, the complete initialization package including initialization instructions (e.g., an entire INITRAMFS and/or drivers and/or other instructions) to initialize each of a plurality of hardware components is sent as a single transmission to each of the respective sections to ensure that drivers are provided to a location in memory which a hypervisor can access to promote securely sending a complete initialization package.

In various examples, the support devices 343-1, . . . , 343-A, and/or data store(s) 308 can be separate and distinct from the physical machines 344-1, . . . , 344-G. As described herein, being separate and distinct refers to an environment being physically separate and/or having separate network resources with respect to each other. In this manner, a physical machine can receive (e.g., remotely receive) a request for a VM from a support device. However, the present disclosure is not so limited. That is, the support devices, data store(s), and physical machines can be at the same location (e.g., included in a common building and/or organization). Regardless, receipt of information (e.g., a request for a VM, a complete initialization package, and/or identifying information, etc.) by the physical machines 344-1, . . . , 344-G can securely sending a complete initialization package, as described herein.

The support devices 343-1, . . . , 343-A and/or the physical machines 344-1, . . . , 344-G can include an electronic display such as a GUI 345. A user interface (UI) can include hardware components and/or computer-readable instruction components. For instance, hardware components can include input components (e.g., a mouse, a touch screen, and a keyboard) and/or output components (e.g., a display, a sound card, a video card). An example UI can include a GUI. A GUI can, for example, electronically represent a VM, provide an indication (electronic representation) of a request for a VM, and/or provide an indication of generated VMs having the respective full functionalities of the respective hardware components, among other possible electronic representations.

Link 346 (e.g., a network) represents a cable, wireless, fiber optic, and/or remote connection via a telecommunication link, an infrared link, a radio frequency link, and/or other connectors or systems that provide electronic communication. That is, the link 346 can, for example, include a link to an intranet, the Internet, or a combination of both, among other communication interfaces. The link 346 can also include intermediate proxies, for example, an intermediate proxy server, routers, switches, load balancers, and the like. However, the present disclosure is not so limited. That is, link 346 can represent a physical connection between the support devices 343-1, . . . , 343-A and the physical machines 344-1, . . . , 344-G to communicate instructions between the physical machines 344-1, . . . 344-G, the support devices 343-1, . . . , 343-A, and/or the data store 308.

Figure 4:
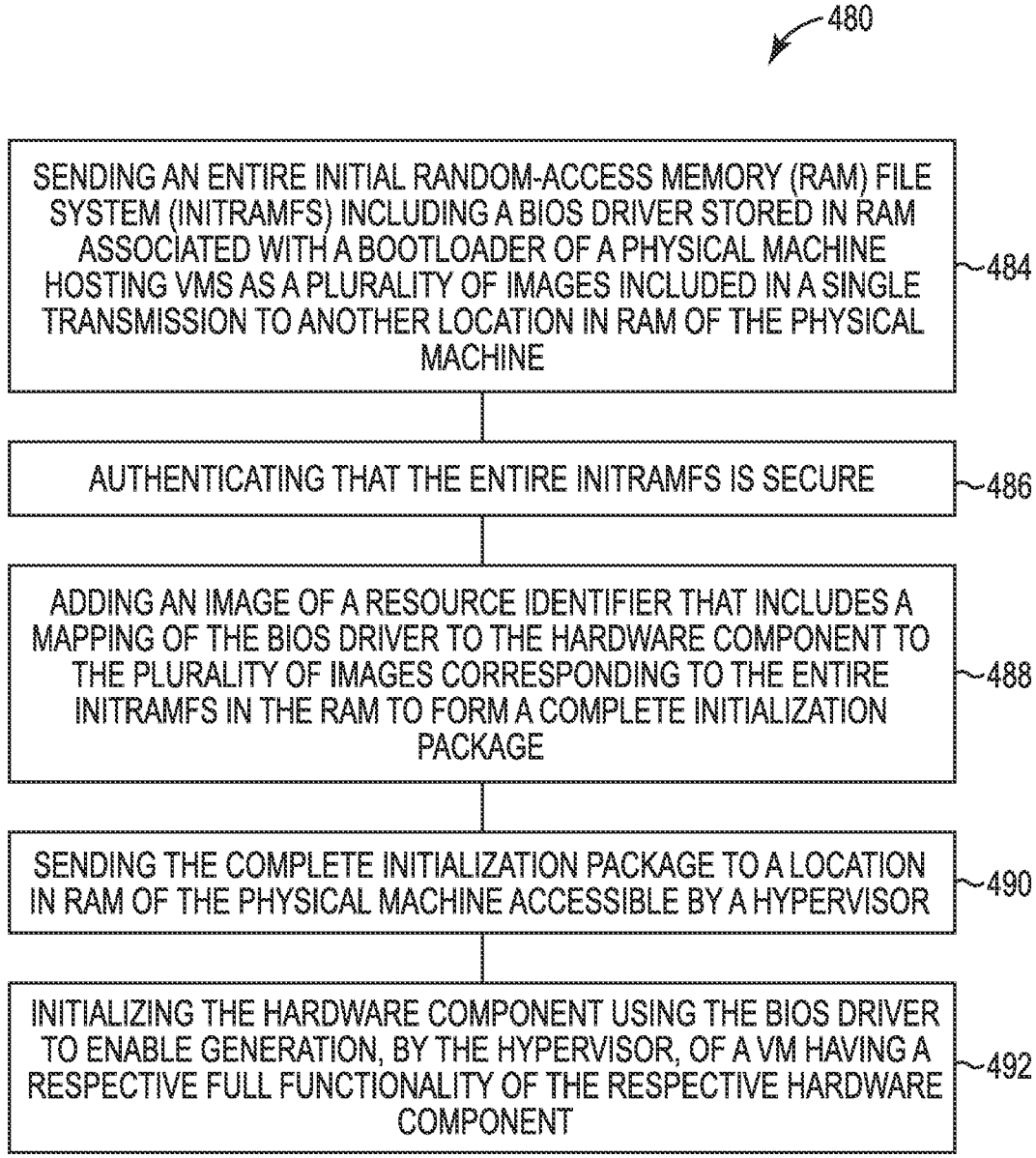
FIG. 4 illustrates a flow diagram of an example of a method for securely sending a complete initialization package according to the present disclosure.

FIG. 4 illustrates a flow diagram of an example of a method for securely sending a complete initialization package according to the present disclosure. As shown at 484, in various examples, the method 480 can include sending an entire INITRAMFS including a BIOS driver stored in RAM associated with a bootloader of a physical machine hosting VMs as a plurality of images included in a single transmission to another location in RAM of the physical machine. An entire INITRAMFS refers to a each image of a plurality of images in an INITRAMFS. That is, in contrast to other approaches which may discard some portions of an INITRAMFS, the present disclosure advantageously utilizes an entire INITRAMFS or plurality of entire INITRAMFSs (corresponding to a hardware component(s)) that stored in the physical machine to promote generation of VMs having a full functionality. A BIOS driver refers to an OpRom driver and/or a UEFI driver. Such a driver can facilitate a respective full functionality of a hardware component, in contrast to Linux driver or other drivers which may be utilized by a Linux operating system or another operating system.

The method 480 can include, authenticating that the entire INITRAMFS is secure, as shown at 486 and as described herein. In some examples, the method 480 can include providing pass through access to respective full functionalities of the respective hardware components using resource identifiers that map particular drivers of the drivers stored in a pass through machine to the respective hardware components. Advantageously, use of stored drivers, in contrast to downloading drivers, enables reliable and timely booting and/or operation of a pass though machine and promotes securely sending a complete initialization package, among other advantages.

As shown at 488, the method 480 can include adding an image of a resource identifier that includes a mapping of the BIOS driver to the hardware component to the plurality of images corresponding to the entire INITRAMFS in the RAM to form a complete initialization package. Such addition can include adding a header and corresponding content as an image in addition to a plurality of images associated with the entire INITRAMFS. For instance an image and/or images corresponding to the resource identifier and/or a BIOS driver can be added to a plurality of images associated with an INITRAMFS (e.g., an entire INITRAMFS) to form a complete initialization package.

The method 480 can include, sending the complete initialization package to a location in RAM of the physical machine accessible by a hypervisor as shown at 490. As shown at 492, the method 480 can include initializing, as described herein, the hardware component using the BIOS driver to enable generation, by the hypervisor, of a VM having a respective full functionality of the respective hardware component.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system comprising:
a processor; and
a non-transitory storage medium storing machine-readable instructions executable on the processor to:
add a resource identifier that includes a mapping of a driver to a hardware component included in a physical machine hosting virtual machines (VMs) to an initial random-access memory (RAM) file system (INITRAMFS) stored in memory of the physical machine to form a complete initialization package, the mapping of the resource identifier included in the complete initialization package comprising an identifier of the driver and an identifier of the hardware component;
send the complete initialization package, including the resource identifier from read-only memory (ROM) of the physical machine, to a location in RAM of the physical machine accessible by a hypervisor, the complete initialization package comprising the driver, the INITRAMFS, and instructions to initialize the hardware component of the physical machine using the driver mapped by the resource identifier;
authenticate that the complete initialization package is secure; and
initialize the hardware component using the driver to cause the hypervisor to generate a VM having a full functionality of the hardware component.

2. The system of claim 1, wherein the INITRAMFS in the complete initialization package comprises a plurality of images, wherein an image of the plurality of images includes a respective header portion and a respective information portion associated with the resource identifier.

3. The system of claim 1, wherein the driver is an option read-only memory (OpRom) driver or a unified extensible firmware interface (UEFI) driver, and wherein the OpRom driver or the UEFI driver is to facilitate the full functionality of the hardware component.

4. The system of claim 1, wherein the full functionality, capable of being provided by the generated VM, is equal to a functionality provided by the hardware component when operating without a hypervisor.

5. The system of claim 1, wherein the physical machine is a pass through machine.

6. The system of claim 1, wherein the resource identifier includes a globally unique identifier (GUID) of the driver and an address of the hardware component.

7. The system of claim 1, wherein the machine-readable instructions are executable on the processor to use a cryptographic signature associated with the INITRAMFS to authenticate that the INITRAMFS is secure.

8. The system of claim 1, wherein the sending of the complete initialization package to the RAM is part of a secure transmission of the complete initialization package.

9. The system of claim 1, wherein the generated VM is to use the driver mapped by the resource identifier.

10. A non-transitory computer readable medium storing instructions executable by a processing resource to cause a device to:
allocate an amount of memory to receive a complete initialization package;
add a resource identifier that includes a mapping of a driver to a hardware component included in a physical machine hosting virtual machines (VMs) to an initial random-access memory (RAM) file system (INITRAMFS) stored in read-only memory (ROM) of the physical machine to form the complete initialization package that includes the resource identifier, the driver, the INITRAMFS, and initialization instructions, the mapping of the resource identifier included in the complete initialization package comprising an identifier of the driver and an identifier of the hardware component;
send the complete initialization package comprising the resource identifier, the driver, the INITRAMFS, and the initialization instructions to a location in RAM of the physical machine accessible by a hypervisor, the initialization instructions to initialize the hardware component of the physical machine using the driver mapped by the resource identifier;
authenticate the complete initialization package is secure; and
initialize the hardware component using the driver to cause the hypervisor to generate a VM having a full functionality of the hardware component.

11. The non-transitory computer readable medium of claim 10, wherein the resource identifier is added using a memcpy( ) function to RAM, the memcpy( ) function not writing the resource identifier to disk memory.

12. The non-transitory computer readable medium of claim 10, wherein the complete initialization package includes identifying information associated with the hardware component.

13. The non-transitory computer readable medium of claim 10, wherein the sending of the complete initialization package to the RAM is part of a secure transmission of the complete initialization package.

14. A method performed by a system comprising a hardware processor, comprising:
sending an initial random-access memory (RAM) file system (INITRAMFS) including a BIOS driver stored in RAM associated with a bootloader of a physical machine hosting virtual machines (VMs) as a plurality of images in a single transmission to another location in RAM of the physical machine;
authenticating that the INITRAMFS is secure;
adding an image of a resource identifier that includes a mapping of the BIOS driver to a hardware component to the plurality of images corresponding to the INIT- RAMFS in the RAM to form a complete initialization package, the mapping of the resource identifier included in the complete initialization package comprising an identifier of the BIOS driver and an identifier of the hardware component;

sending the complete initialization package to a location in the RAM of the physical machine accessible by a hypervisor, the complete initialization package comprising the image of the resource identifier, the BIOS driver, the INITRAMFS, and instructions to initialize the hardware component of the physical machine using the BIOS driver mapped by the resource identifier; and initializing the hardware component using the BIOS driver to enable generation, by the hypervisor, of a VM having a full functionality of the hardware component.

15. The method of claim 14, comprising displaying a representation of the added image that includes a file name associated with the mapping.

* * * * *